May 13, 1969  W. G. DIETRICH  3,443,824
CRASH ATTENUATION DEVICE
Filed Sept. 19, 1967  Sheet 1 of 3

INVENTOR.
WILSON G. DIETRICH
BY
Braddock & Burd
ATTORNEYS

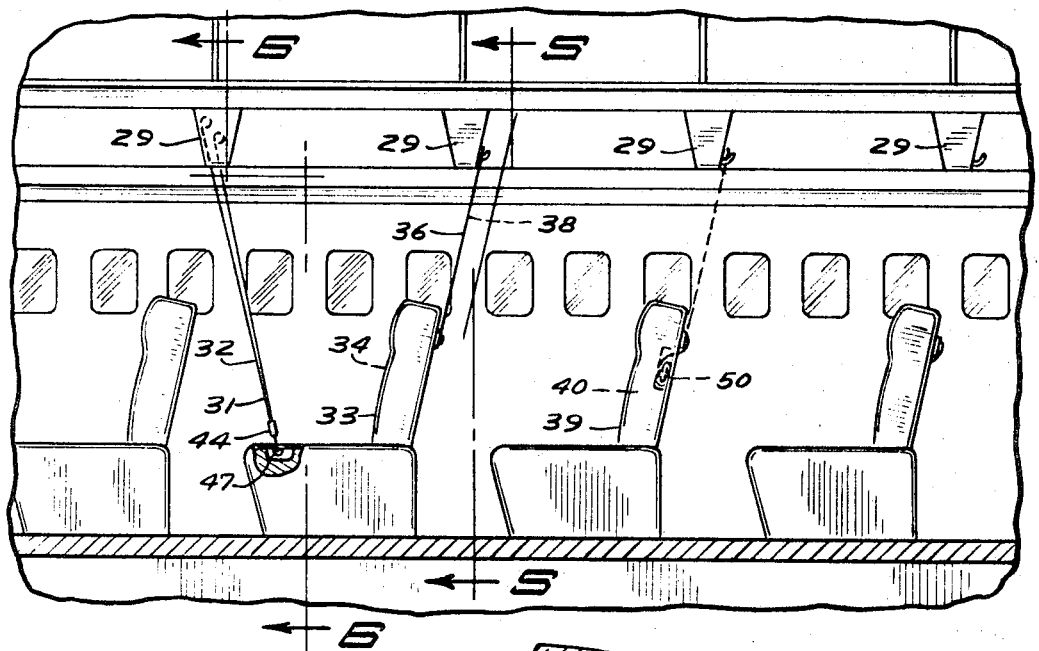
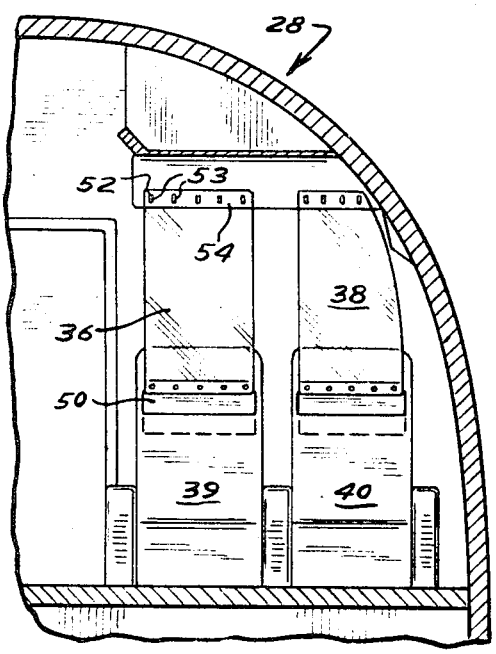
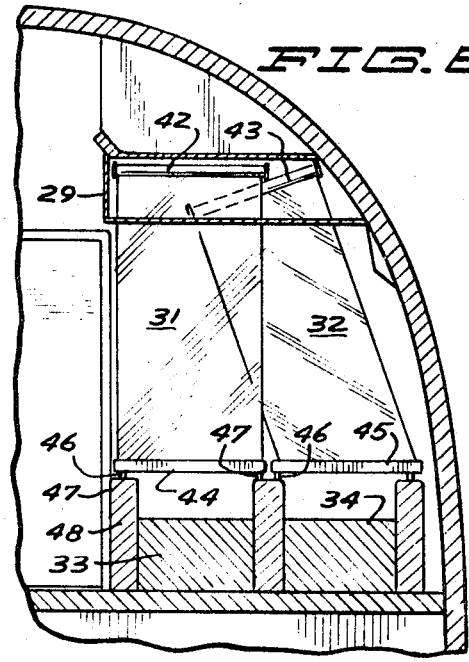

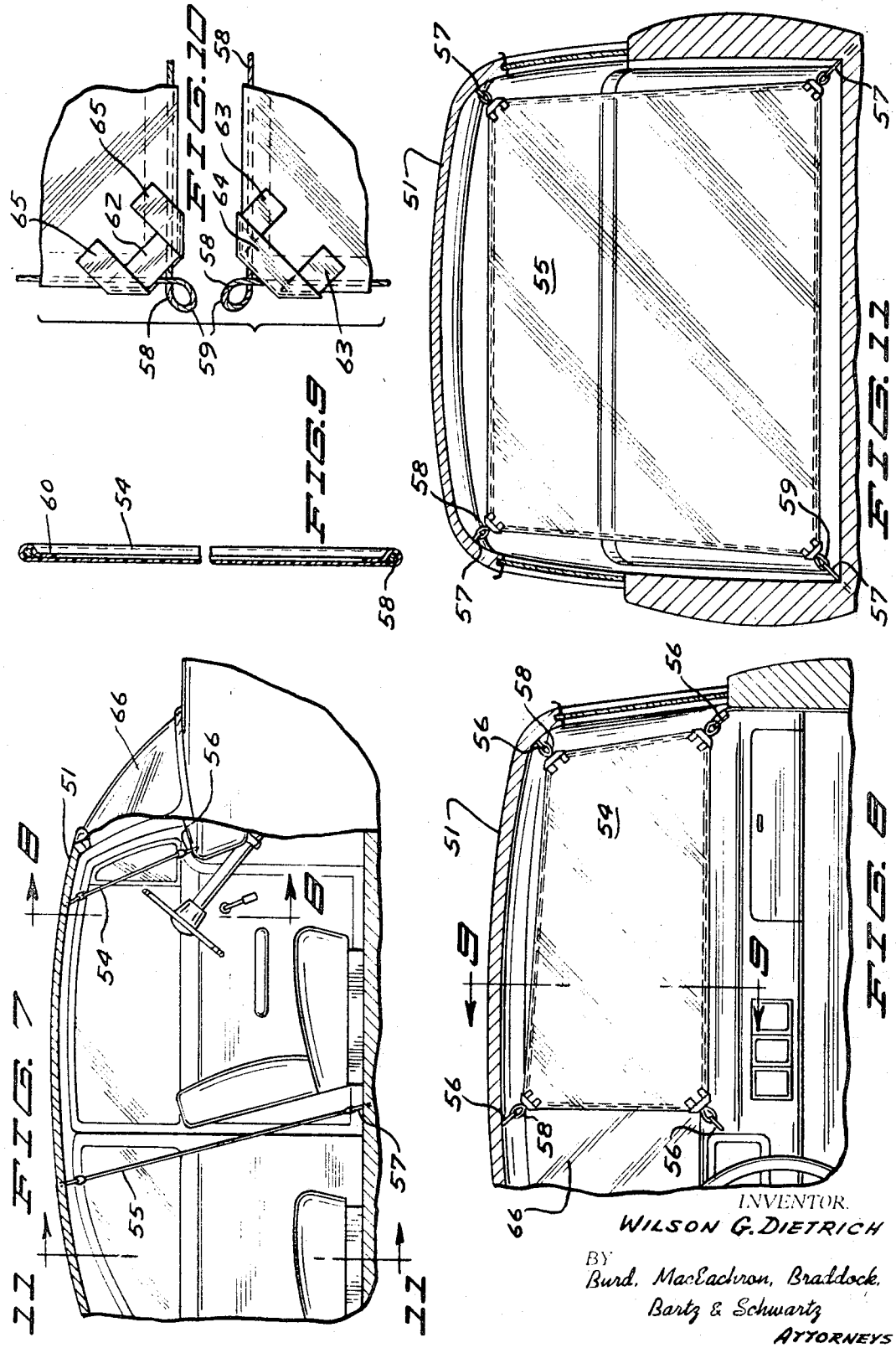

_United States Patent Office_

3,443,824
Patented May 13, 1969

3,443,824
CRASH ATTENUATION DEVICE
Wilson G. Dietrich, Western Ave. S.,
Faribault, Minn. 55021
Continuation-in-part of application Ser. No. 446,949,
Apr. 9, 1965. This application Sept. 19, 1967, Ser.
No. 683,044
Int. Cl. B60r 21/04
U.S. Cl. 280—150  5 Claims

ABSTRACT OF THE DISCLOSURE

A transparent flexible sheet of material having a relatively low initial yield point, a relatively high ultimate tensile strength and good tear resistance is firmly and tautly held along the edges thereof in a vehicle between a passenger and obstructions ahead of the passenger and spaced away from both. This sheet forms a shield which will absorb the energy of the moving passenger when he strikes it as a result of a crash of the vehicle.

Cross reference

This application is a continuation-in-part of my copending application Ser. No. 446,949, filed Apr. 9, 1965 now abandoned.

Background of invention

Safety devices for vehicles to mitigate damage and loss of life to passengers and drivers thereof have received increasing attention as the incidence of such damage has so sharply risen over the years. The interposition of a shield between a passenger and the objects which can injure the passenger when struck by him during the crash of a vehicle is not a new idea, but is one which has not been effectively used before the present invention.

In the prior art, it was proposed in U.S. Patent No. 2,715,042 to position plastic materials such as those known as "Lucite" or as "Plexiglas" between a passenger in the front seat of an automobile and the windshield. The manner of the attachment of such material as shown in the drawings in that patent indicates that the patentee contemplated using a stiff, hard material.

Rigid transparent materials were also suggested in U.S. Patent No. 2,757,040 for use as shock absorbing members. The material disclosed was again "Plexiglas." Tests have shown, however, that "Plexiglas" and "Lucite" and similar materials shatter once the impact is sufficiently great to cause rupture. In such tests, there was produced sharp fragments and edges which will do damage similar to that caused by the plate glass used as windshields before the advent of safety glass.

Seat belts which stretch across the waist of a passenger suffer from the disadvantage that sudden stops cause the passenger to pivot about the belt often times bringing his head down hard against the dash or other obstruction positioned in front of him.

Seat belts which stretch across the body of the occupant from the upper shoulder area to the waist, in common with all other restraints which must be attached each time the passenger takes his position in the car, suffer from the disadvantage of being confining and troublesome to properly attach. Many times such seat belts are not buckled or are not buckled properly by the passenger each time before the car is put into motion.

All of the safety devices mentioned above, and many others, suffer from the disadvantage that they must absorb the shock of the kinetic energy of the passenger upon the crash of the car over a substantially instantaneous time period, over zero distance, and over a small concentrated area, thus subjecting the passenger to very high momentary or instantaneous shock on relatively small areas of his person.

Summary

The safety shield of the present invention can be permanently or at least fixedly positioned within a vehicle in spaced relation from a passenger, and in spaced relation from objects which the passenger would otherwise hit upon crash of the vehicle. It will have a relatively low initial yield point so that the forward-most protuberance of the passenger as he crashes into the shield will cause the shield to yield, thus bringing it into contact with the wider areas of the passenger's person without doing extensive damage to such protuberance. For example, the shield will conform to the shape of the passenger's nose and face, thus spreading the stress over the area of the face. The wider surface contact between the shield and the passenger will, of course, reduce the specific and average stress in terms of pounds per square inch at the time of the crash. As the shield yields, the passenger's kinetic energy will be dissipated over a finite time interval and this will also tend to lower the maximum stress in terms of pounds per squire inch at any time attained on the person of a passenger.

Thus, as the kinetic energy of the movement of the passenger is absorbed by the shield, this energy is absorbed over a significant distance, over a substantial area, and through a finite time span. Even in instances where the kinetic energy of the passenger striking the shield will be sufficient to ultimately rupture the shield, the maximum absorption of energy, and consequent subtraction of this energy from the passenger, will in most cases be sufficient to very substantially lessen the damage to the passenger as he moves on through the shield into the objects beyond.

Films which have been found to have the properites necessary to be useful as safety shield made according to the invention include polyester films manufactured by The Goodyear Tire & Rubber Company under the trademark Videne; and polyester films manufactured by E. I. DuPont De Nemours & Company under the trademark Mylar and described in such sources as: Encyclopedia of Chemical Technology, edited by Kirk and Othmer, first supplemental volume, published by Interscience Encyclopedia, Inc., New York, copyright 1957. Other transparent, pliant, malleable sheets will also serve effectively.

The safety shield of the present invention can be left in place without interference with the normal activities of a vehicle passenger, and so will always be ready in the event of a crash or other sudden change of direction of the vehicle. Since a passenger protected by such a shield need not necessarily utilize a safety belt, the passenger's entire person can be thrown into the shield thus greatly spreading out the area of contact and hence the stress per square unit of area, thus reducing the damage or shock to the passenger and reducing the shield's tendency to rupture. The conformation of the shield to the contour of the moving passenger reduces the tendency of damage to the passenger at the point of initial contact of the passenger with the shield. Should the shield rupture due to its maximum strength being exceeded, the ruptured shield will cause no damage whatever to the passenger, and will have absorbed a good share of the kinetic energy of the passenger before rupturing. No slivers or splinters or sharp edges can possibly result. Because the shield will absorb energy over a wide surface area as it is deformed to a considerable depth or distance during an appreciable time interval, localized stresses on the passenger are minimized and permanent injuries to the passenger such as broken bones, strained muscles and sprained ligaments are less likely to occur. Replacement of shields of the invention is simple, easy and relatively inexpensive so any regulations adopted requiring such shields will be more easily enforced than regulations which require a larger expenditure of money and more trouble on the part of the vehicle owner.

Several methods for tautly mounting the safety shield of the invention have been devised. For example, the shield can be permanently fastened along one edge and then hooked into place along an opposite edge. It can be fastened from each of the four corners. A line, rope or filament can be extended down two or more of the edges of the material of the shield, the material of the shield doubled back over the line and fastened by a pressure-sensitive adhesive tape or can be molded into the edges of the shield sheet. These lines can then be fastened to the framework of the car to properly position the shield. A particularly effective method of fastening involves fastening a line or filament of nylon or similar material into a hem in all four edges of the sheet through the use of pressure-sensitive tape or with the use of an adhesive material or heat-sealing or molding along the edges of the material. This continuous loop of line or filament is then fastened by the four corners into place in the vehicle. Another way to provide a filament along the edge of the shield would be to mold a bead of the shield material around all four sides of the shield. Then holes could be left at the four corners so that the fastening means would bear against the corners of the beads to hold the shield in place.

A rigid metallic frame can be provided with the shield cemented or clamped to the frame; or a strap or series of straps may be molded into the shield or cemented to it and this strap or these straps slipped over a hook anchored to the frame of the car.

*Description of drawings*

FIG. 4 is a side elevational view with parts in section and parts broken away of the interior of a conventional aircraft with the position of several safety shields of the invention shown therein;

FIG. 5 is a vertical sectional view taken on the line 5—5 in FIG. 4;

FIG. 6 is a vertical sectional view taken on the line 6—6 in FIG. 4;

FIG. 7 is a side elevational view with parts in section and parts broken away of a non-conventional automobile showing two safety shields of the present invention in place therein;

FIG. 8 is an enlarged vertical sectional view taken on the line 8—8 in FIG. 7;

FIG. 9 is an enlarged vertical sectional view of a safety shield of the invention taken on the line 9—9 in FIG. 8;

FIG. 10 is a fragmentary two-part view of the upper lefthand corner of the safety shield as seen in FIG. 8 with the lower portion of FIG. 10 being taken from the front in FIG. 8 and with the upper portion of that figure being a view of the same corner portion as if it was folded upwardly to reveal the rear side as seen in FIG. 8; and FIG. 11 is a vertical sectional view taken on the line 11—11 in FIG. 7.

*Description of preferred embodiments*

Figure 1:
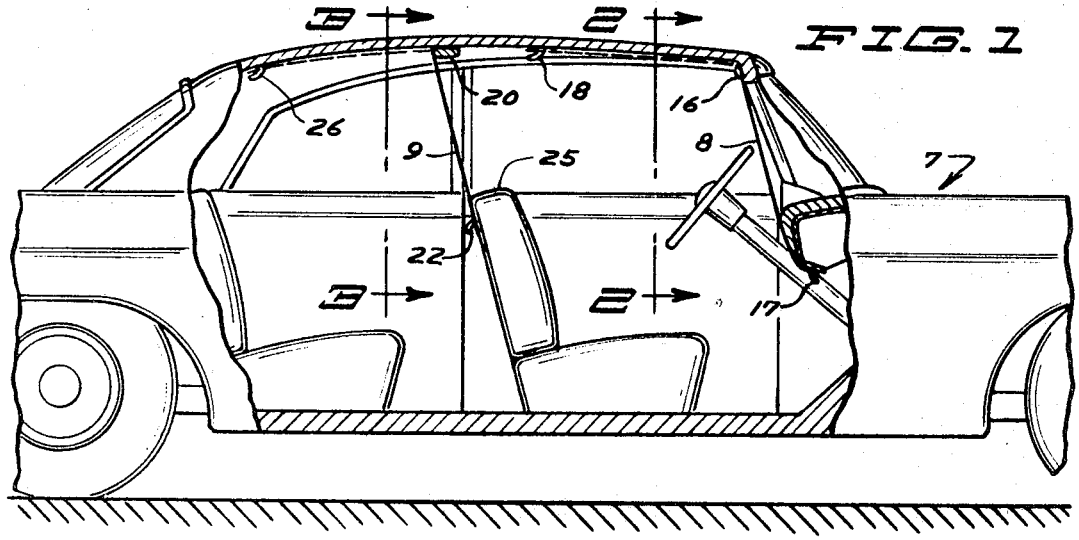
FIG. 1 is a side elevational view with parts in section and parts broken away of a conventional automobile showing a first safety shield of the invention in position to protect a passenger on the front seat against damage due to his forward movement during the crash of an automobile, and showing a second safety shield of the invention in position to protect the rearward movement of the head of the passenger in the front seat or the forward movement of a passenger in the rear seat.
Figure 2:
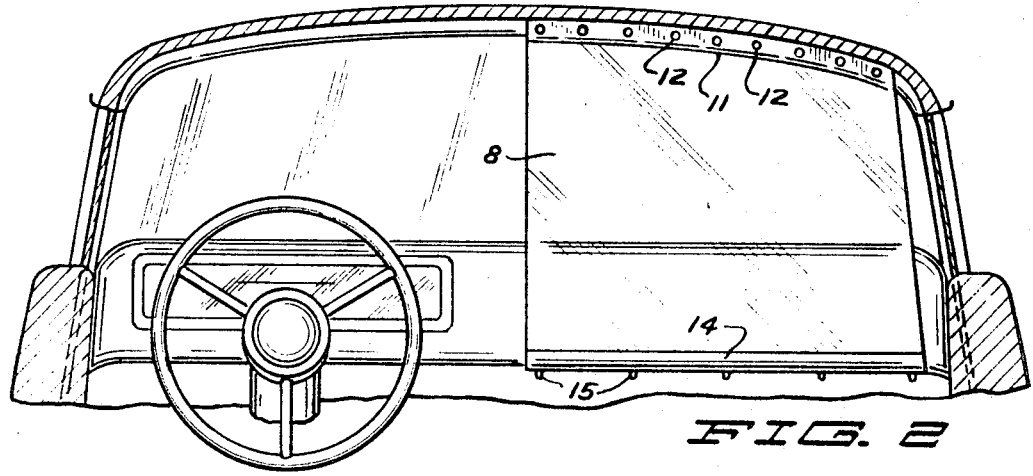
FIG. 2 is a vertical sectional view taken on the line 2—2 in FIG. 1.
Figure 3:
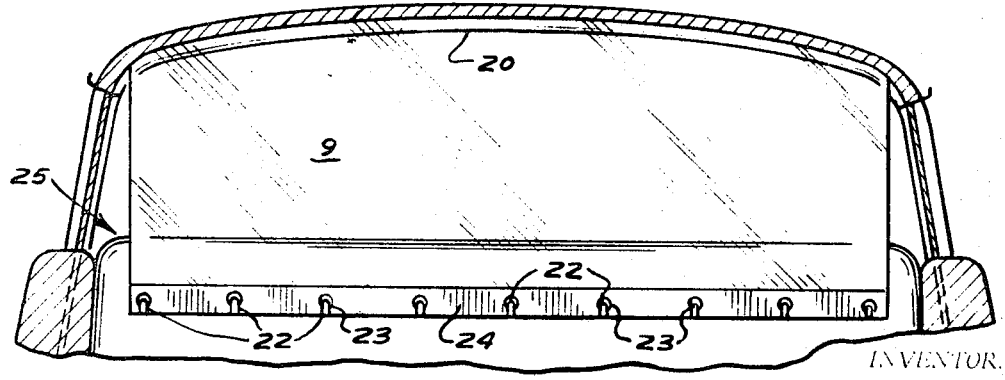
FIG. 3 is a vertical sectional view taken on the line 3—3 in FIG. 1.

In FIGS. 1, 2 and 3 an automobile 7 is provided with a first safety shield 8 in front of the right windshield and a second safety shield 9 extending from the roof of a car to the back of the front seat. These shields are transparent and are made of films having a relatively low initial yield point, a relatively high ultimate tensile strength and good tear resistance. As shown, the front shield 8 is mounted along its top marginal edge to the garnished molding of the automobile. This shield includes a reinforced marginal edge portion 11 having a plurality of spaced perforations 12. The perforations can be suitably reinforced by grommets (not shown). Similarly, a reinforced marginal bottom portion 14 of this shield is also provided with a plurality of spaced perforations.

Shield 8 is mounted in its taut operative position by the use of hooks 16 extending outwardly from the garnished molding and by hooks 17 extending outwardly from the bottom edge of the dash compartment. These hooks are spaced to align with the perforations 12 at the top and the perforations at the bottom of the shield. Should it be desired, for any reason, to replace the shield 8, because of its use in a crash, or to obtain access to a glove compartment in the dash, or any other purpose, this can be done by pulling the lower marginal edge of the shield downwardly and off of the hooks 17 to relieve the tension and then removing it from the hooks 16. The shield can be reinstalled or replaced by hooking the perforations once again in the hooks 16 and 17.

Hooks 18 are provided across the top of the car just above the back of the front seat 25 for the purpose of temporarily holding the shield 8 out of its operable position, should this become necessary or desirable.

The rear shield 9, as shown, is mounted between a ceiling molding 20 and a plurality of back seat hooks 22, which engage perforations 23 along a bottom reinforced edge 24 of such shield. A stiffener (not shown) could be incorporated into the reinforced portion 24 with openings provided in it to align with the perforations 23. Rear storage hooks 26 in the roof of the car are provided to secure the shield 9 in its raised position as shown in FIG. 1 in dotted lines, and for storage purposes.

In FIGS. 4, 5 and 6, various ways of supporting safety shields of the invention with respect to a conventional airplane 28 are shown. The headers 29 of the airplane are shown conventionally spaced in parallel relation to each other and are used as supports for the top edges of the safety shield. As shown, there is a separate shield provided for each of the occupants of the passenger compartment of the airplane. Shields 31 and 32 are shown in FIG. 4 and in FIG. 6. The top edge of the shield 31 is supported on a spring-loaded roller 42 while the top edge of the shield 36 is supported on a spring-loaded roller 43, both of which rollers are concealed in the header 29. As shown, the bottom edges of the shields 31 and 32 are secured to lower cross bars 44 and 45, respectively. These cross bars are firmly fixed to the bottom edges of the shields and are themselves secured to strap elements 46 which are releasably connected to catches 47 provided in conjunction with arm rests 48. Lower corners could also be attached to straps mounted to the airframe at or through the floor.

When the passengers are first taking their places in the aircraft, the safety shields 31 and 32 will be stored within the headers 29 so that only the cross bars 44 and 45 extend downwardly within reach of the passengers. When the passengers are in their seats, they will draw the bars 44 and 45 downwardly, respectively, and fasten them by means of the strap elements 46 to the arm rests 48. Thus the passengers will have sufficient movement within the seat compartments, and can receive their food trays, for example, in much the same manner as is presently the custom when seat belts are loosely fastened.

The shields 31 and 32 are fastened to the rollers 42 and 43 in such a manner that when the shields are fastened in a position as seen in FIG. 6, for example, the safety shields are completely unwound, and are taut on the rollers so that subsequent stress on the shield when in crash use, for example, will no longer tend to unroll the roller, but will merely utilize the full strength of the roller to help absorb and withstand the stresses of the shield.

Shields 36 and 38, as seen in FIGS. 4 and 5, are provided with perforations 53 in a reinforced top marginal edge 54 which are fastened over hooks 52 in the header as shown. Similar perforations and hooks are provided at 50 in the backrests of the seats 33, 34, 39 and 40. These hooks can be in a storage compartment as suggested at 50.

In FIGS. 7 through 11, an automotive vehicle 51 of somewhat modified design has a forward safety shield 52 and a rearward safety shield 53 mounted therein.

In order to mount the forward shield 52, a plurality of fasteners such as hooks 56 are mounted firmly in the frame of the car at appropriate locations. Similar hooks 57 are mounted in the frame of the car 51 to accommodate and firmly support the rear shield 53.

A rope or line or single nylon filament 58, for example, extends around on all four sides of each of the shields 52 and 53 and is overlapped at the corners thereof to provide fastening eyelets or loops 59. An especially effective way of bonding the filament 58 into the shield 52 is to overlap an outermost portion of the shield back on itself as shown at 60 and to provide an adhesive between the two portions of the shield resting upon themselves. Under certain condtions, these two portions could be bonded to each other by heat sealing or by the use of a pressure-sensitive tape.

One means of reinforcing the corners is to utilize pressure-sensitive tape in a first layer 62 across the corner diagonally as shown in FIG. 10, upper portion with the ends of the tape being bent over to show as at 63, 63 in FIG. 10, lower portion. A second piece of tape is put diagonally across the corner so that it will show as at 64, FIG. 10 lower portion, with the ends appearing as at 65, 65 of FIG. 10 upper portion.

When the safety shields are installed, the hooks 57 and 56 will be in such position and the size of the shields will be of such dimension that the shields are both taut.

In FIG. 7, it will be noted that the car body has been redesigned over the present conventional structure to provide for a windshield 66 spaced substantially forwardly from that of the conventional automobile of FIG. 1, for example. Further, the spacing between the rear and front seats will be such that there will be room to receive the feet and legs of the rear passengers without undue confinement by the rear safety shield 53. As an optimum condition, eighteen inches can be provided between the taut safety shield and the nearest object from which it is desired to protect a passenger. Under ordinary circumstances, a spacing of one foot between such objects will be satisfactory, and a spacing of as little as six inches or less will be effective to very substantially limit and reduce damage in crash situations.

*Operation*

When a vehicle is involved in a crash, in the large majority of cases, the vehicle decelerates rapidly if not substantially instantaneously, and passengers or other objects within the vehicle will tend to continue to move, by their own momentum and kinetic energy of motion, toward the front of the vehicle. The safety shield of the present invention is designed to intercept passengers before they strike objects ahead of them in the vehicle and to absorb a large measure of, if not all of the kinetic energy of motion of the passenger. The mechanics of the action of all of the shields will be substantially the same, and this action will be described in the terms of a passenger sitting in the right front seat of the automobile as seen in FIG. 7. Assuming this automobile to have crashed into a barrier in front of it, the passenger will tend to continue to move toward the shield 52. Assuming further that the passenger was aware of the impending crash and braced his feet on the floor board, he would tend to pivot about his feet, and his head would come into violent contact with the shield. With his head in an upright position, the nose is assumed to be the first portion of the body to hit the shield. As soon as the stress exerted by the nose on the transparent, flexible, malleable, pliant material of the shield exceeds the low initial yield point, the shield will be deformed in the area of the nose and this deformation will continue until the other areas of the face come to bear on the shield. Then the other forwardly extending areas of the face will likewise cause the shield to deform and more of the face, upper body including shoulders of the passenger will come into contact with the shield, and each will assume its portion of the load. Although this can happen in a relatively short time interval, because of the yielding action which does take place, a finite time period is involved, and some of the kinetic energy of motion of the passenger is absorbed during each increment of this time period. Since the shield itself yields as soon as the low initial yield point is reached in a particular area, the stress per unit area on the passenger is never in excess of the yield point of the shield, and this stress is rapidly distributed over a wide area of the passenger's person as the yielding takes place. If and when the high ultimate tensile strength of the flexible sheet is exceeded, the passenger will continue on through the sheet, and could, in extreme situations, come in contact with the inner side of the windshield 66, where all of the expected damage in crash situations would occur to the extent that the kinetic energy of the passenger had not been absorbed. In cases where the flexible sheet material has been chosen because of its good tear resistance, the exceeding of the ultimaate tensile strength in one area (for example where the nose hits the shield) may not necessarily cause the tensile strength of the material to be exceeded in other areas, and even where one or more breaks occur, the shield will often be effective to prevent the passenger from passing clear through it and into contact with objects beyond.

Thus it will be seen that good tear resistance is a desirable property in films utilized to make safety shields of the invention. Still shields which are merely pliant and malleable and have a low enough yield point to prevent serious injury to a passenger due to the shield itself and a high enough ultimate tensile strength to absorb a substantial amount of the kinetic energy or motion of the passenger, will be effective even without the good tear resistance property.

*Testing*

It is recognized that testing with a crash sled and a dummy of the same size, weight and configuration as a passenger would have been very helpful, but there are only two known sleds in the United States and they are both booked for months to come. Sufficient financial means are not available to construct such test equipment. In place of that, the following tests were run:

EXPERIMENT A1

A two-inch angle iron frame, rectangular in shape and slightly larger than the average windshield was fixedly mounted in a horizontal position, and the shield was formed as shown and described in connection with safety shield 52 in FIGS. 7 through 10, except that pressure-sensitive tape was used around the hem of the sheet and nylon rope 58 instead of a bonding material as shown at 60. The loops 59 were anchored to the corners of the angle iron test frame.

The film utilized was three-mil Mylar type D as specified in DuPont Bulletin M–2B (A–32984), and DuPont Bulletin M–1D (A–44619).

A stone weighing sixteen pounds was utilized. It was smaller in size than an average human head, but the weight corresponded to the weight of the head and neck of the average man's body. With the support frame fixedly mounted in a horizontal dimension, position spaced from the floor, the stone was dropped through eight feet on the shield to develop a speed of seventeen miles per hour.

Observed Results: No rupture occurred; the shield conformed to the shape of the stone readily; the maximum depth of penetration by the stone into the shield was four inches; after the test the shield was deformed three-quarters of an inch.

EXPERIMENT A2

Same condition as Experiment A1, except that the stone was dropped from a height of twenty-five feet to develop twenty-nine miles per hour.

Observed Results: This shield burst.

EXPERIMENT B1

Same condition as Experiment A2 above, except that a twelve pound bowling ball was substituted for a sixteen pound stone.

Observed Results: Shield did not burst.

EXPERIMENT C1

Same conditions as Experiment A1 above except that a lamination of two independent sheets of three-mil Mylar type D was used.

Observed Results: Shield conformed to shape and area of stone readily; maximum depth during simulated crash—three and one-half inches; residual deformity— three-quarters inch.

EXPERIMENT C2

Same conditions as Experiment C1, except that the stone was dropped to develop twenty-nine miles per hour.

Observed Results: Shield did not rupture; it conformed readily to the shape of the stone; maximum depth during simulated crash—nine inches; residual deformity—four inches.

EXPERIMENT D

Same conditions as Experiment A2 above, except that five-mil Mylar was used. The shield did not rupture; maximum deformation during simulated crash—eight inches; residual deformation—three inches; shield conformed easily to shape and area of stone.

EXPERIMENT E

Same conditions as Experiment A2 above, except that the shield was made up of lamination of two sheets of two-mil Mylar, one on either side of a center lamina of two-mil Surlin Type A (described in Modern Plastics 42, 981 dated September 1964).

Observed Results: Shield did not rupture; conformed easily to the area and shape of the stone; maximum deformation under simulated crash—eleven inches; residual deformation—five and one-half inches.

EXPERIMENT F

A two inch angle iron frame slightly larger than the windshield of the average automobile was again utilized, and three-mil Mylar Type D was taped directly to the angle iron frame, the frame was fixed in a horizontal position, and the sixteen pound stone was dropped on it from a height of eight feet to simulate the crash occurring at seventeen miles per hour.

Observed Results: The shield did not rupture; it conformed to the area and shape of the stone; maximum deformation during the simulated crash—two inches; residual deformation—three quarters of an inch.

EXPERIMENT G1

The conditions were identical with those for Experiment F, except that the shield was made up of a lamination of two sheets of two-mil Mylar, one on either side of a center lamina of two-mil Surlin Type A.

Observed Results: The shield did not burst; maximum deformation during simulated crash—three inches; residual deformation—one inch; easily conformed to the shape of the stone.

EXPERIMENT G2

Same conditions as Experiment G1, except that the stone was dropped from twenty-five feet to attain approximately twenty-nine miles per hour.

Observed Results: Shield did not rupture; maximum deformation under crash simulation—six inches; residual deformation—three inches; shield conformed to the shape and area of the stone.

EXPERIMENT H1

A three-sixteenths inch sheet of Plexiglas manufactured by Rohm & Haas such as specified in U.S. Patent No. 2,715,042 and large enough to cover the windshield of an automobile was anchored to the rectangular one-half inch angle iron frame in the manner specified in the patent. The sixteen pound stone was dropped from a height of only three feet to develop a speed of only nine miles per hour.

Observed Results: Shield shattered, leaving pieces not unlike silicon glass in nature; the maximum deformation before rupture was one-quarter of an inch; there was no indication that the Plexiglas pieces conformed to the shape of the stone.

EXPERIMENT H2

Same conditions as Experiment H1, except that a sheet of three-sixteenths inch Lucite manufactured by The Goodyear Tire & Rubber Company was used.

Observed Results: Shield shattered, leaving pieces not unlike silicon glass in nature; the maximum deformation before rupture was one-quarter of an inch; there was no indication that the Lucite pieces conformed to the shape of the stone.

EXPERIMENT I

Same conditions as Experiment H1, except that a sheet of Plexiglas one-sixteenth inch thick was used.

Observed Results: Plexiglas shield shattered; very little resistance to energy; no conformation of the shield or pieces to the shape of the stone; maximum depth obtained before rupture—one-half inch.

What is claimed is:

1. A crash attenuation device for use to protect a protuberance of a person in a vehicle, said device comprising: a safety shield of plastic sheet material which is substantially deformable without rupturing, pliant and malleable and has an ultimate tensile strength to absorb from the person impinging on it a substantial amount of the persons kinetic energy of motion having an initial yield point low enough so that the sheet material will yield and deform to conform to the curvature of the protuberance bringing into contact with the sheet material a substantial area of the protuberance before injury is caused to the protuberance striking the sheet material; said sheet material of said shield also has substantial tear strength; mounting means attached to said sheet material, said mounting means including a line attached to said shield around the periphery thereof, and supporting means to support said mounting means and said sheet material in fixed spaced relation to an interior portion of a vehicle in a position normally spaced from the protuberance such that said sheet material can intercept the protuberance when it moves with respect to said vehicle, said sheet material also is supported in space relation to said protuberance to be protected and to bodies in said vehicle on a side of said sheet material opposite said protuberance; said supporting means is attached to said line to support said mounting means and said shield.

2. A crash attenuation device for use to protect a protuberance of a person in a vehicle, said device comprising: a safety shield of plastic sheet material which is substantially deformable without rupturing, pliant and malleable and has an ultimate tensile strength to absorb from the person impinging on it a substantial amount of the persons kinetic energy of motion and having an initial yield point low enough so that the sheet material will yield and deform to conform to the curvature of the protuberance bringing into contact with the sheet material a substantial area of the protuberance before injury is caused to the protuberance striking the sheet material; said sheet material of said shield also has substantial tear strength; mounting means attached to said sheet material along at least two opposite edges thereof, and supporting means to support said mounting means and said sheet material in fixed spaced relation to an interior portion of a vehicle in a position normally spaced from the protuberance such that said sheet material can intercept the protuberance when it moves with respect to said vehicle, said sheet material also is supported in spaced relation to said protuberance to be protected and to bodies in said vehicle on a side of said sheet material opposite said protuberance; said mounting means [includes portion of material along the periphery of said shield, said portion] being provided with eyelets, and wherein said supporting means is attached to said mounting means through said eyelets.

3. The combination as specified in claim 1 wherein said line is provided with fastening eyelets at corners of said shield and said supporting means is attached to said mounting means through said eyelets.

4. The combination as specified in claim 3 wherein said line is attached to said shield through the instrumentality of a loop of a peripheral portion of said shield back over said line and adhesively fastened to adjacent portions of said shield.

5. The combination as specified in claim 4 wherein said eyelets are constituted as loops of said line, and reinforcing means for anchoring at least one of said eyelets is provided, said reinforcing means including at least one length of tape adhesively fastening said eyelet and said line with respect to the corner of said shield adjacent said eyelet and adhesively fastening a peripheral portion of said shield back onto itself, said tape consisting of a central portion and to opposite end portions adjacent said central portion and extending outwardly therefrom from opposite ends thereof, said central portion of said tape being adhesively disposed diagonally across a corner of said shield between said eyelet and the main body of said shield and in contact with a first face of said shield, and said opposite ends of said tape being disposed around said line and adhesively across a peripheral portion of said shield on a second opposite face of said shield.

References Cited
UNITED STATES PATENTS

| | | | |
|---|---|---|---|
| 2,586,063 | 2/1952 | Kurtz | 280—150 |
| 2,757,040 | 7/1956 | McLelland | 296—84 |
| 2,715,042 | 8/1955 | Lancaster | 296—84 |
| 2,827,305 | 3/1958 | Graham | 280—150 |
| 2,979,129 | 4/1961 | Ketchum | 160—368 |
| 3,237,778 | 3/1966 | Hoodis | 160—354 |
| 3,321,003 | 5/1967 | Boerner | 160—330 |

FOREIGN PATENTS 845,079 8/1960 Great Britain.

BENJAMIN HERSH, *Primary Examiner.*

L. DANIEL MORRIS, JR., *Assistant Examiner.*

U.S. Cl. X.R.

244—122; 296—84, 65